R. E. JOHNSON.
CARRIAGE AXLE.
APPLICATION FILED JUNE 24, 1905.
900,859.
Patented Oct. 13, 1908.
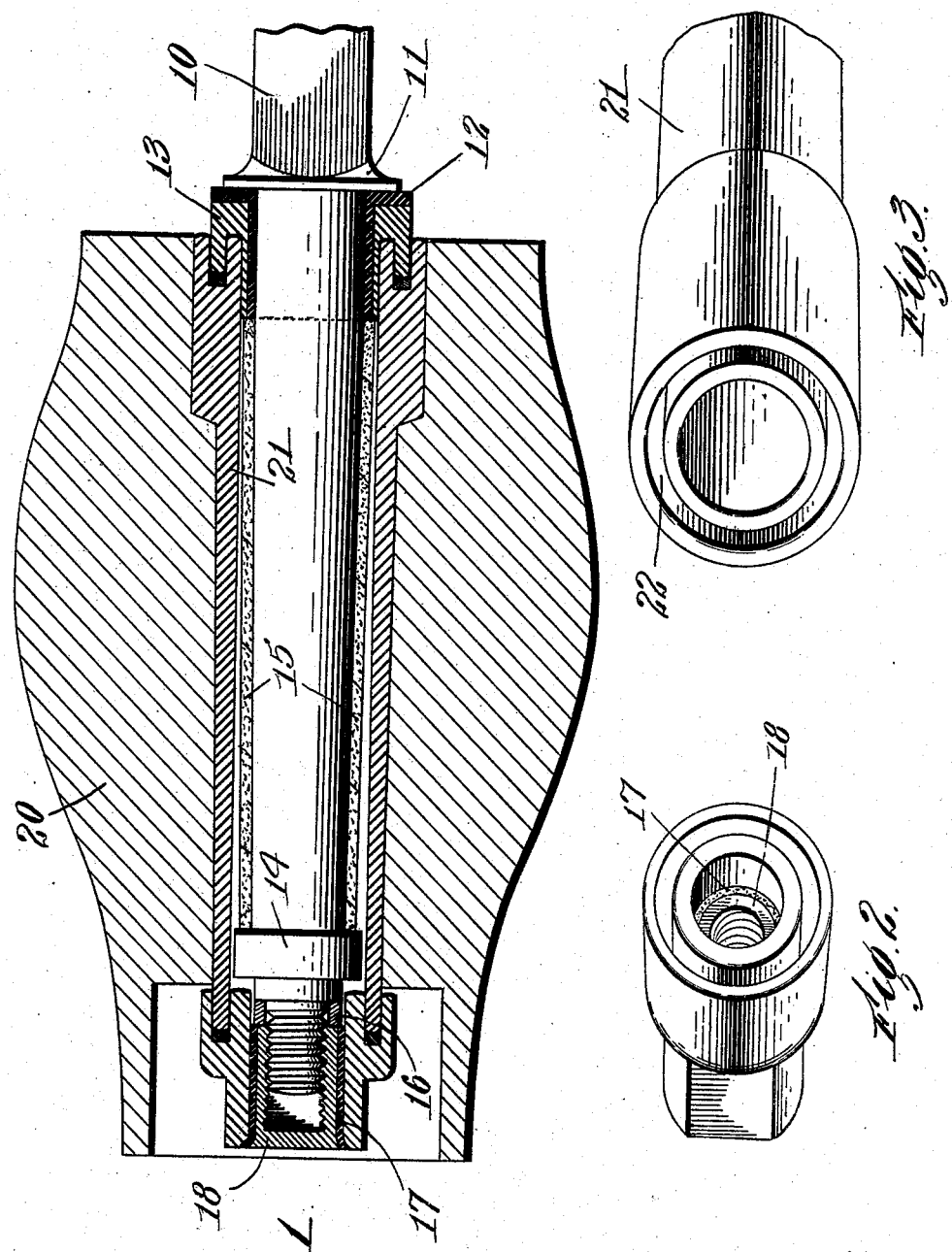

UNITED STATES PATENT OFFICE.

ROBERT E. JOHNSON, OF NEW YORK, N. Y., ASSIGNOR TO N. Y. DASH & AXLE MFG. CO., OF NEW YORK, N. Y., A CORPORATION OF NEW YORK.

CARRIAGE-AXLE.

No. 900,859.      Specification of Letters Patent.      Patented Oct. 13, 1908.

Application filed June 24, 1905. Serial No. 266,708.

*To all whom it may concern:*

Be it known that I, ROBERT E. JOHNSON, a citizen of the United States, residing at New York, in the county of New York and State of New York, have invented a new and useful Carriage-Axle, of which the following is a specification.

This invention relates to that class of carriage axles which are used for the lighter and better classes of road vehicles.

The especial object of this invention is to provide a carriage axle construction in which a wheel hub turns upon bearings on a collar or enlargement at the inner end of the hub, and on a bearing in the axle-nut, whereby slight deflections or bending of the axle will not add materially to the frictional resistance of the wheel, and whereby a large oil chamber will be provided at the center of the hub which may contain a sufficient quantity of oil to serve lubrication for comparatively long periods.

A further object of this invention is to insulate the bearings of a wheel-hub by means of bushings of fiber or other non-conducting material to avoid the generation of electricity or magnetism tending to crystallize and weaken the metal of the axle.

To these ends this invention consists of the improved carriage axle and of the combinations of parts therewith as hereinafter described and more particularly pointed out in the claims at the end of this specification.

In the accompanying drawing, Figure 1 is a sectional view of a carriage hub, and of sufficient parts of a carriage axle to illustrate the application of this invention, Fig. 2 is a detail perspective view of the nut, and Fig. 3 is a fragmentary perspective view of the hub bushing.

In ordinary carriage axle constructions which are now most widely employed, the wheel hub has a bearing engagement with the axle substantially the entire width of the hub. This bearing is usually somewhat tapered, and in order to keep a carriage in good running condition, frequent lubrication of the carriage-axle is necessary.

In practice I have found that the use of a comparatively long surface of engagement between the axle and hub is objectionable not only on account of the difficulty of keeping the axle well lubricated, and on account of the difficulty of fitting said parts accurately when first assembled, but is also objectionable for the reason that when heavy loads are supported by a carriage axle, the axle will spring or be flexed to a greater or less extent. This bending or flexing takes place even inside the bearing of the carriage wheel, and although comparatively slight, it tends to cause the carriage wheels to stick or bind.

In a carriage axle constructed according to this invention, I have overcome this difficulty by mounting the carriage wheel so that it will have a bearing at its inner end upon an enlargement or collar of the axle, and a bearing at its outer end in the axle nut.

By adopting this construction I have been able to secure a construction which is not affected by the slight bending or distortion of the axle under heavy loads and which is also advantageous as it enables me to provide an oil chamber near the center of the hub for containing a sufficient supply of lubricating oil to last for long periods. The oil chamber may, if desired, be provided with wicking or absorbent material for retaining and absorbing the oil, and in order to exclude dust or other foreign substances from the oil chamber, I preferably make the bearings in the form of annular grooves, one bearing groove being formed in the inner bearing of the bushing, and the other bearing groove being formed in the axle nut.

In the use of a comparatively light carriage axle, particularly when said carriage axle is made of a highly carbonized grade of steel, it frequently happens that the metal of the axle itself will become crystallized and so brittle that the same will break readily. This crystallization of a steel axle I believe to be due, to a considerable extent, to electricity generated at the bearings of the hub, and to the resulting magnetism and molecular changes which may be effected thereby in the steel.

In mounting a carriage wheel according to this invention, I preferably avoid the crystallization of the axle by insulating both the inner and outer bearings of the wheel hub by means of bushings or washers of fiber or other insulating material.

Referring to the accompanying drawing for a detail description of a construction embodying this invention, 10 designates a carriage axle which may be square, or of other usual form in cross section. Near its end the axle 10 is provided with a shoulder 11. Fastened onto the carriage axle 10 near the shoulder 11 is a compound or composite bearing piece or collar consisting of a fiber bushing 12, and an outside metal bushing 13. At its end the axle 10 is provided with a collar or enlargement 14, and wound upon the axle between the collar 14 and the composite bearing collar I provide a cover of wicking or similar absorbent material 15. The carriage axle 10 is threaded in the usual manner and may have one or more spacing washers 16 for determining the position of the axle-nut. The axle nut comprises a grooved metal body portion which forms the outer bearing of the wheel hub, an insulating fiber bushing 17, and a threaded center part 18. The metal and fiber bushings may be fixed or free to rotate. No positive means is shown for holding them in fixed position. The wheel hub 20 may be of the usual construction, and is provided with a metal bushing 21 which is enlarged and provided with a groove 22 at its inner end engaging the corresponding groove of the composite bearing piece. The outer end of the bushing 21 fits into the groove of the axle nut.

In the use of a carriage wheel as thus mounted, it will be seen that the bearings are substantially at the opposite ends of the hubs; that said bearings will run without increase of friction due to slight deflections or bending of the axle under loads; that a large oil chamber will be provided near the center of the hub which may contain wicking absorbing sufficient oil for keeping the bearings well lubricated for comparatively long periods; that the bearings at the ends of the hub are of annular or dust excluding character; and that the wheel bearings themselves will be insulated from the axle so as to prevent crystallization of the metal of the axle due to electricity or magnetism.

I am aware that changes may be made in the style and shapes of parts embodied in an axle construction without departing from the scope of my invention as expressed in the claims. I do not wish, therefore, to be limited to the particular form I have herein shown and described, but What I do claim and desire to secure by Letters-Patent of the United States is:—

1. In a construction of the class described, the combination of an axle, an axle nut thereon, and a wheel hub having a bearing at its inner end supported by the axle and having a bearing at its outer end on the axle nut, said wheel hub being spaced from the axle between said bearings, and insulation between the axle and said bearings to prevent the flow of electricity between said axle and wheel-hub.

2. In a construction of the class described, the combination of an axle, an axle nut therefor, and a wheel-hub having a bearing at its inner end supported from said axle and having a bearing at its outer end supported from said axle nut, the bore of said wheel-hub being larger than said axle, and said bearings having a diameter greater than that of the axle, whereby said wheel-hub is spaced from the axle at all points between said bearings, and means for insulating one of said bearings from the axle.

3. In a construction of the class described, the combination of an axle, an axle nut, a wheel hub, a metallic bushing secured in the wheel hub and having an annular or dust-excluding bearing at its inner end on the axle, and having an annular or dust-excluding bearing in the axle nut at its outer end, and a packing of absorbent material wound upon the axle for containing oil near the center of the hub, said bearing on the axle comprising an outside metallic bushing and a non-metallic bushing.

4. In a construction of the class described, the combination of an axle, an axle nut, and a wheel hub having a bearing at its inner end on the axle, and having a bearing at its outer end on the axle nut, whereby an oil chamber will be left at the center of the hub, said bearing on the axle comprising an outside metallic bushing and a fiber bushing.

5. In a construction of the class described, the combination of an axle having a bearing thereon consisting of a fiber bushing and an outside metallic bushing, said metallic bushing having an annular groove therein, an axle nut having an annular groove therein, a wheel hub, and an axle bushing secured on the wheel hub, one end of said bushing entering a bearing in the annular groove in the axle nut and the other end having an annular dust-excluding channel fitting the outer wall of said groove in the metallic bushing, said axle bushing being spaced from the axle throughout its length.

In testimony whereof I have hereunto set my hand, in the presence of two subscribing witnesses.

ROBERT E. JOHNSON.

Witnesses:
 ALLAN TAYLOR,
 JAMES SHEEGAN.